INVENTORS.
FRED J. BAGEMAN
BY CHARLES FRANCIS
ATTORNEYS

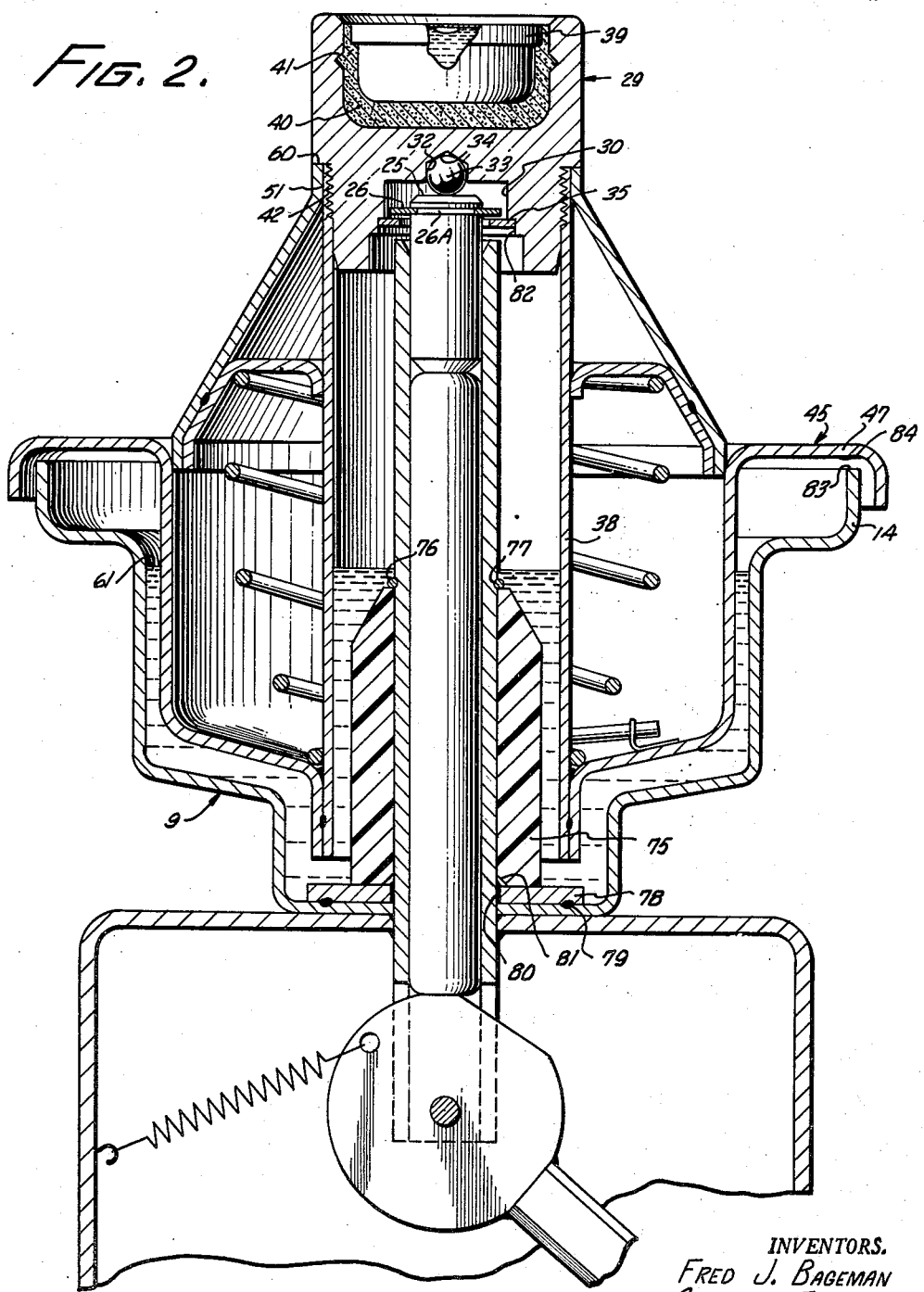

United States Patent Office 3,055,221
Patented Sept. 25, 1962

3,055,221
PIVOT MOUNTING FOR STATIC
WHEEL BALANCER
Fred J. Bageman, Santurce, Puerto Rico, and Charles
Francis, La Crescenta, Calif.; said Francis assignor to
said Bageman
Filed Dec. 8, 1959, Ser. No. 858,245
12 Claims. (Cl. 73—484)

This invention relates to apparatus for the pivot mounting of a static wheel balancer.

A purpose of the invention is to provide a pivot mounting for a static wheel balancer which includes in a single, compact, relatively small unit all the elements of the pivot which are sensitive, vital to the accuracy of the balancer, and seriously affected in their operation by wear or abuse, namely, the pivot point or ball proper, a short segment of the pedestal which carries the surface on which the pivot point or ball bears, and the level which indicates static balance or imbalance. A further purpose is to provide a pivot mounting as above-described which is easily detachable from the remainder of the apparatus as a compact, small unit in order to facilitate and decrease the cost of its replacement or repair.

Another purpose of the invention is to provide apparatus for disengaging the pivot when impact loads are to be imposed upon the balancer and to transmit such loads directly to the base of the balancer without imposition of load on the pivot or on the means for disengaging the pivot. A further purpose is to provide means whereby the pivot disengagement and transmission of loads directly to the base as above described is automatically effected so that such is the normal condition of the balancer when it is not in use.

A problem in known static wheel balancers is a pivot structure which is integral with or difficult to remove from the remainder of the apparatus and, even when removed, is a large, unwieldy structure, possibly including elements only indirectly associated with the pivot itself. This results in the pivot of the balancer being expensive to repair or replace. This problem is particularly present because the pivot structure of a static wheel balancer is a delicate and sensitive mechanism, vital to the accuracy of the balancer, which is prone to malfunctioning, either because of abuse or wear.

Another problem in some known static wheel balancers is that, although they have means for disengaging the pivot when the balancer is to be subjected to impact loads, such loads are transmitted through the disengaging mechanism to the base, thus necessitating an unduly heavy disengaging mechanism and enhancing the possibilities of malfunction of same. A further problem is the necessity for manual operation of the disengagement mechanism, so that inadvertance or carelessness of the operator may result in failure to disengage the pivot when the balancer is being loaded, with consequent damage to the pivot from the impact loads imposed.

Our invention obviates the problems described above.

The invention will be more clearly understood by reference to the following detailed description thereof, taken in conjunction with the accompanying drawings in which:

FIG. 2 illustrates a longitudinal diametrical sectional view of the supporting head of a wheel balancer which includes another embodiment of our invention.

Figure 1:
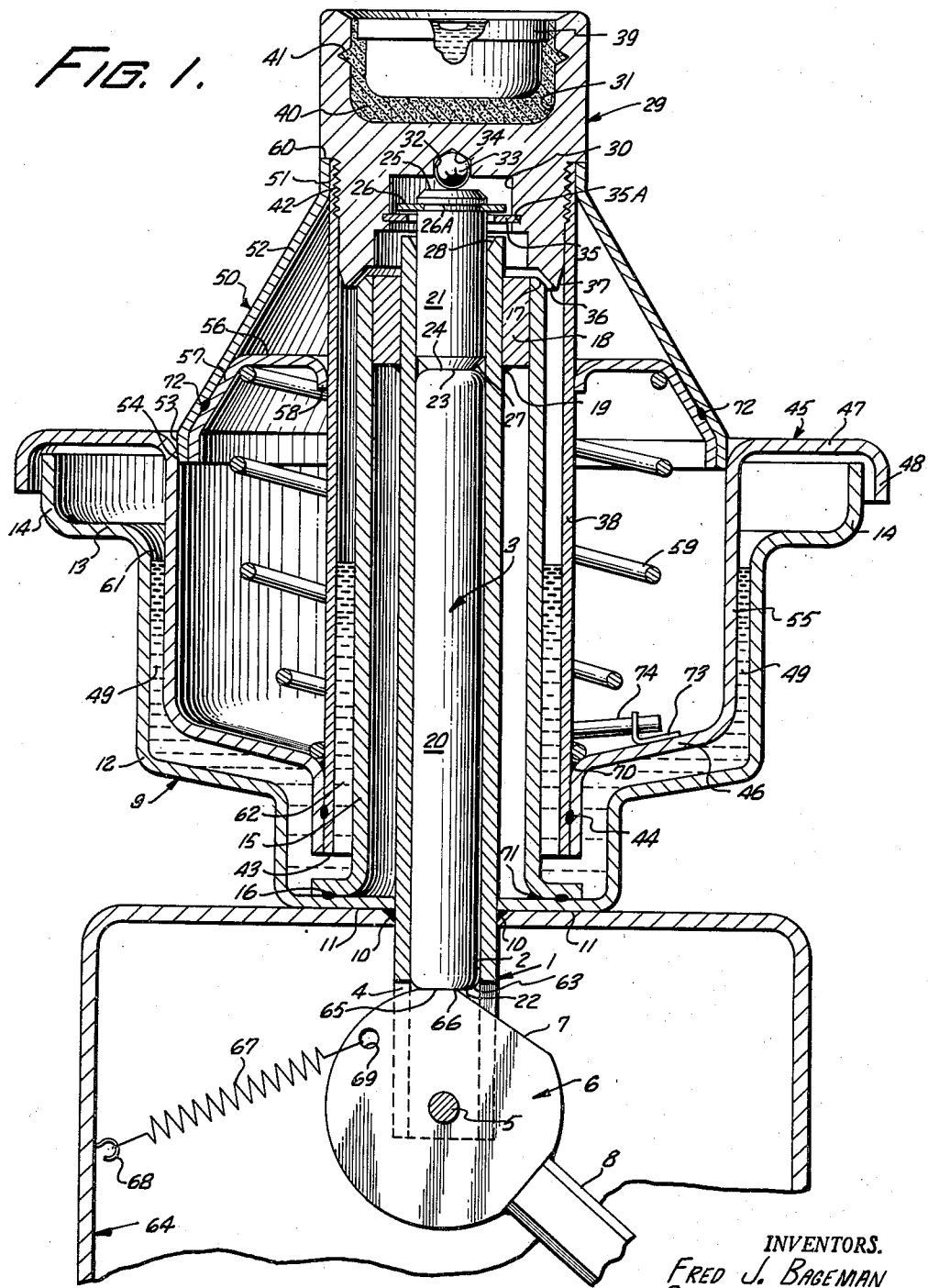
FIG. 1 illustrates a longitudinal diametrical sectional view of the supporting head of a wheel balancer which includes our invention.

Referring now to FIG. 1, the supporting head has a cylindrical support sleeve 1 which has a longitudinal cylindrical bore 2. The support sleeve is immovably fixed to and mounted upon a ground supported base 64, which is shown schematically and in practice would be suitably reinforced and braced to carry the loads imposed. The bore of the support sleeve slidably carries a cylindrical pedestal indicated generally at 3. The lower end of the support sleeve has a diametrical bifurcation 4 which receives a cam 6 pivotally mounted on a diametrical cam journal 5. The cam journal is oriented at right angles to the bifurcation and is carried by the bifurcated ends of the support sleeve.

The cam 6 is a substantially circular disc cut away along a chord to form a peripheral flat portion 7 and along a second intersecting chord to form a second peripheral flat portion 65. The cam carries a handle 8 adapted to rotate the cam about the cam journal in such manner that when the handle is moved downwardly the cam is rotated clockwise to dispose flat 65 of the cam within the bore of the support sleeve and when the handle is moved upwardly the flat 7 of the cam is disposed within the bore of the support sleeve. When flat 7 is disposed within the bore of the support sleeve, the pedestal is in lowered position, and when the flat 65 is disposed within the bore, the pedestal is in raised position. The perpendicular distance of the flat 7 from the center of rotation of the cam is less than the perpendicular distance of the flat 65. The difference in spacing of the two flats determines the net amount of upward displacement of the pedestal when it is moved from the lowered position to the raised position. A tension spring 67 is connected to the base 64 by bracket 68 and to the cam by the hole 69 in which a hook on the spring registers. It will be noted that the intersection 66 of the two flats is located a greater distance from the center of rotation of the cam than either of the flats, so that counterclockwise rotation of the cam to place the pedestal in its lowered position will necessitate first lifting the pedestal and the load it pivotally carries. The tension of the spring 67 when the flat 65 is within the bore of the support sleeve and the radial location of the hole 69 from the center of rotation of the cam are determined in accordance with conventional design procedure so that the moment imposed upon the cam is sufficient to lift the pedestal by counterclockwise rotation of the cam and the pedestal becoming supported on the peak 66 rather than on the flat 65, when the wheels support member 45 does not carry an outside load but insufficient otherwise. Consequently, when a wheel or other load is removed from the wheel support member the cam is rotated automatically by the spring in a counterclockwise direction until flat 7 is disposed within the bore of the support sleeve, thus lowering the pedestal. As a result, the normal, unloaded position of the pedestal is its lowered position. If desired, the spring 67 may have a sufficient initial bias to counteract the weight of the handle 8 so as to insure that the bearing engagement of the pedestal and face 7 is maintained until an outside force is applied to the handle 8 to rotate the cam in a clockwise direction and thus raise the pedestal.

An annular liquid bowl 9 is rigidly attached to and carried by the support sleeve at 10. The liquid bowl has a lower substantially horizontal planar portion 11 which bears on the base of the wheel balancer and upwardly and outwardly extending side skirt 12 which terminates in an outwardly extending substantially horizontal portion 13 and an upwardly extending lip 14. The portion 13 and lip 14 form a gutter to prevent overflow of the damping liquid 61 disposed within the liquid bowl.

As shown in FIG. 1, an upwardly extending annular support web 15 surrounds the support sleeve in spaced relation thereto and is rigidly attached at its lower end 16 to the lower planar portion of the fluid bowl 9. The upper end of the support web has an annular beveled face 17 complementary to the annular beveled face 36. A filler annulus 18 is disposed in the annular space lying between the upper ends of the support sleeve and the support web and is attached to the support sleeve at 19, thereby providing lateral support for the upper end of the support sleeve.

The pedestal 3 is comprised of a follower portion 20 and a tappet portion 21. The lower end 22 of the follower is adapted to ride on the periphery of the cam and thereby to be elevated when in contact with flat 65 of the cam and to be lowered when in contact with the flat 7 of the cam. Rounded chamfer 63 on the lower end of the follower enables smooth following of the follower between the flats. The upper end 23 of the follower is in bearing contact with the lower end 24 of the tappet. Tappet 21 is adapted to be slidably removed from the bore of the support sleeve and has an upper planar face 25 which extends at substantially right angles to the longitudinal axis of the pedestal. The upper end of the tappet carries an external substantially horizontal outwardly extending annular flange 26, which may be a resilient ring disposed in annular groove 26a. The lower end of the tappet has an annular bevel 27 which, in cooperation with the complementary annular bevel 28 on the bore of the support sleeve, facilitates insertion of the tappet into the bore of the support sleeve.

A substantially cylindrical pivot head 29 is disposed centrally over the pedestal and has cylindrical recesses 30 and 31 in its lower and upper ends. A centrally disposed cylindrical counterbore 32 in the horizontal face of recess 30 receives a portion of a metal pivot sphere 33 which is adapted to contact the planar face 25 of the tappet when the pedestal is in raised position and to be disengaged therefrom when the pedestal is in lowered position. The pivot sphere is preferably press fitted into the counterbore 32 in order to prevent it from leaving the counterbore when the pivot has been disengaged, but, if desired, the pivot sphere may have a sliding fit in the counterbore and the vertical displacement of the pivot on disengagement be made sufficiently small to prevent the sphere from leaving the counterbore, thus leaving the sphere free to rotate randomly in the counterbore and thereby distribute wear over the surface of the sphere. Instead of a press fit of the sphere in the counterbore, the sphere may be inserted in the counterbore slightly beyond its diametrical plane and the outer edge of the counterbore peened over the pivot sphere to form retaining lips on the counterbore. The counterbore 32 terminates in a conical face 34 which has its apex on the central axis of the pivot head and serves to orient the pivot sphere concentrically with the pivot head. The lower end of the pivot head has an annular inwardly extending lip 35 and an annular beveled face 36. In FIG. 1, the annular lip 35 is a ring made of resilient material, such as spring steel, disposed in annular recess 35a in the pivot head. The ring has a radial gap so that it may be circumferentially compressed in order to decrease its circumference sufficiently to enable it to be removed from the recess 35a for removal of the tappet from recess 30 and access to the pivot sphere. The annular lip 35 surrounds the tappet in spaced relation thereto and extends horizontally sufficiently to overlap the annular flange 26 on the tappet. The lip is disposed on the pivot head so that it is spaced vertically from the flange 26 when the pedestal is in raised position and in contact with or slightly spaced from the flange when the pedestal is in lowered position. In FIG. 1, beveled face 36 is concentric with the pivot sphere 33 and is adapted to be spaced vertically from the beveled face 17 carried by the support sleeve when the pedestal is in raised position and to be in bearing contact therewith when the pedestal is in lowered position. The vertical spacing between the beveled faces 17 and 36 is slightly less than the net downward movement of the follower portion of the pedestal in order that when the pedestal is lowered, the beveled faces 17 and 36 will first seat and then the additional downward travel of the pedestal will disengage the pivot sphere 33 and the planar face 25 of the pedestal. If desired, the lip 35 may be spaced from the flange 26 by an amount slightly less than the difference between the vertical spacing of the beveled faces 17 and 36 and the net downward travel of the pedestal follower 20 in order that when the pedestal is in lowered position, the face 23 of the pedestal follower 20 and the face 24 of the pedestal tappet 21 will be slightly disengaged. The lower portion of the pivot head has a second annular beveled face 37 which facilitates insertion of the pivot head into the wheel support sleeve 38. The recess 31 in the upper end of the pivot head receives a conventional circular spirit level 39 concentrically with the pivot sphere. The spirit level is held in the recess by means of plaster of Paris or the like 40 which is keyed to the pivot head by means of annular groove 41 in the wall of the recess. The pivot head is threadedly received within the annular wheel support sleeve 38 by threads 42 so that the pivot head and the tappet may be removed by unscrewing the pivot head and lifting it upwardly.

The annular wheel support sleeve 38 extends downwardly from the pivot head in spaced relation to the annular support web 15 and terminates at its lower end 43 spaced from the bottom of the liquid bowl, thereby forming an annular chamber 62 between the support web and the wheel support sleeve for the damping liquid 61 disposed within the liquid bowl. Rigidly attached at 44, as by spot welding, to the wheel support sleeve is an annular wheel support member 45 which has an upwardly and outwardly extending annular wall 46 and a vertical upwardly extending annular wall 55 terminating in a planar substantially horizontal annular portion 47 and a downwardly extending vertical annular lip 48 overlapping in spaced relation the lip 14 of the liquid bowl. The overlapping lips 48 and 14 form a seal to keep foreign objects out of the damping liquid. The upwardly extending walls 46 and 55 of the wheel support member are inwardly spaced from the upwardly extending wall of the liquid bowl in order to form an annular chamber 49 within which damping liquid 161 is disposed of. The annular chamber 49 communicates with the annular chamber 62 so that a common body of damping liquid occupies both. The planar portion 47 of the wheel support member forms a surface which supports the member being statically balanced. A suitable oil seal, such as an epoxy resin, is disposed annularly at 70 to insure that there will be no leakage of damping liquid through the joint formed at the connection of the wheel support member to the wheel support sleeve. A similar seal is preferably provided at 71 between the liquid bowl and the annular support web 15. A centering core 50 is slidably mounted at 51 on the wheel support sleeve and has an outwardly and downwardly extending conical body 52 which terminates in a vertical downwardly extending annular skirt 53 slideably bearing at 54 on the inner surface of the annular vertical wall 55 of the wheel support member. The surface of the centering cone is that of a frustum of a cone. The apex of the cone forming the conical portion 52 of the centering cone is concentric with the pivot sphere 33. The centering cone carries an inwardly extending annular flange 56 which has a portion 57 complementary to the lower portion of the centering cone and attached thereto, as by spot welds 72, and a vertical downwardly extending annular lip 58 which surrounds and slideably bears against the wheel support sleeve. A conical helical compression spring 59 bears at its lower end against the junction of the wheel support member and the wheel support sleeve and at its upper end against the flange 56 of the centering cone to urge the centering cone upwardly against the annular shoulder 60 on the pivot head. The end 74 of the spring is connected to the wheel support member 45 by bracket 73 secured to the wheel support member. The centering cone is thus adapted to extend through the central opening of the member being balanced in order to orient such member concentrically with the pivot sphere.

The embodiment shown in FIG. 2 is identical in all respects with the embodiment shown in FIG. 1 and described above, except as noted herein. This embodiment omits the annular support web 15, the filler annulus 18, and the complementary beveled faces 17 on the support sleeve and 36 on the pivot head. The pivot head and its attached wheel support sleeve 38 and wheel support member 45 are supported on the annulus formed by the substantially horizontal face 83 of the lip 14 of the liquid bowl 9 bearing on complementary face 84 of the wheel support member when the pedestal is in the lowered position. For this purpose, the spacing between the face 83 and the face 84 of the wheel support member is made the same as the vertical spacing between the beveled faces 17 and 36, as hereinbefore described for the embodiment shown in FIG. 1. An annular filler member 75, preferably made of plastic, surrounds the support sleeve in contact therewith in order to improve the damping characteristics of the damping liquid 61. The filler 75 bears on an annular filler plate 78 and is retained in position by a split ring 76 disposed in an annular groove 77 formed in the support sleeve. The filler plate 78 reinforces the fluid bowl and is attached thereto at 79 as by spot welding. A damping liquid seal 80, preferably of an epoxy resin, is disposed between the filler plate 78 and the support sleeve. Internal annular bevel 81 on the filler member 75 provides clearance between the filler member and the liquid seal 80. In the pivot head 29, the annular groove 35a which receives the lip 35 is omitted and replaced by an annular notch 82 which receives annular lip 35. The annular lip 35 is a ring, preferably of soft metal, disposed in the notch 82 and removably retained therein by peening of the notch in order to form frangible retaining lips thereon.

In operation, when the wheel support member 45 is not supporting an external load, the tension spring 67 rotates the cam in a counterclockwise direction until flat 7 of the cam is disposed within the bore of the wheel support sleeve, as described above in connection with the cam. If a load is carried by the wheel support member, the rotation of the cam may be accomplished by force applied to the cam handle 8. The pedestal is thus lowered by an amount equal to the difference between the perpendicular distances of the flats 65 and 7 from the center of rotation of the cam. Since the vertical distance between beveled face 17 carried by the support sleeve and beveled face 36 on the pivot head, or, in FIG. 2, between face 83 of the liquid bowl and face 84 of the wheel support member, is less than the net downward travel of the pedestal, the faces first seat and then the planar face 25 of the pedestal is disengaged from the pivot sphere 33. In this position, the pivot head and the wheel support member connected thereto are solidly supported by annular support web 15 and support sleeve 1, or, in FIG. 2 by the liquid bowl 9, which transmit any loads imposed upon the wheel support member 45 directly to the base of the apparatus without imposing any load on the pivot sphere, pedestal or cam. In this position, the wheel to be balanced may be loaded on, or removed from, the wheel support member, or other impact loads imposed upon the wheel support member, such as the attachment of balancing weights to the wheel being balanced. To determine the static balance or imbalance of the wheel and the balancing weights required therefor, the cam is rotated in a clockwise direction by application of force to the cam handle 8, thereby disposing flat 65 within the bore of the support sleeve and causing upward movement of the pedestal. This results first, in engagement of the pivot sphere with the planar face 25 of the pedestal and then, upon further upward movement of the pedestal, of disengagement of the faces 17 and 36, or in FIG. 2, faces 83 and 84. the flange 26 and lip 35. The pivot head together with its connecting wheel support member bearing the wheel are now pivoted freely and universally on the pedestal, and static balance or imbalance of the wheel may be determined in conventional manner through means of the circular spirit level 39. After the balancing operation has been completed, the pedestal is either manually lowered to disengage the pivot and directly support the pivot head and the load carried thereby on the base for unloading, or the balancer is first unloaded and then the pivot automatically disengaged by operation of the spring 67 upon the cam 6.

A distinct advantage of our apparatus is the construction of the pivot mounting. The pivot mounting is comprised of the pivot head 29, spirit level 39, pivot sphere 33 and pedestal tappet 21. These elements are the most critical parts of wheel balancing apparatus because they are primarily responsible for its accuracy and are the most likely to malfunction because of their sensitivity to wear or abuse. Consequently, it is highly advantageous to have these elements easily accessible and removable so that they can be repaired or replaced. This is possible with the construction of our pivot mounting. As can be seen from the drawing, the pivot mounting may be removed from the apparatus merely by unscrewing it and lifting it upwardly. In so doing, the pedestal tappet, which bears the critical planar bearing face 25, is removed from the apparatus together with the pivot head by engagement of lip 35 and flange 26. After removal of the pivot mounting from the apparatus, removal of lip 35 from the recess 35a or, in FIG. 2, notch 82, in the pivot head enables removal of the tappet from the recess 30 and access to the pivot sphere and planar face 25 of the tappet for replacement or repair. The assembled pivot mounting may be replaced in the apparatus by merely inserting the pedestal tappet within the bore of the support sleeve and screwing the pivot head on the wheel support sleeve. Thus, the pivot mounting, containing the critically sensitive elements of the balancer, may be easily removed as a small compact unit for repair or replacement without need for disassembly of other parts of the balancer. It is also to be noted that due to the separation of the pedestal into the tappet and follower, malfunctioning of the planar face 25 of the pedestal necessitates removal and repair or replacement of only the upper portion of the pedestal which bears the critical planar face, not the entire pedestal, which facilitates and reduces the cost of such repair or replacement.

We claim:

1. In a wheel balancer, an upwardly extending substantially vertical support sleeve immovably fixed to a supporting base, a pedestal movably carried within the support sleeve, means for moving the pedestal between a raised and a lowered position, a pivot head substantially aligned with the pedestal which pivotally engages the pedestal in raised position and which is disengaged from the pedestal in lowered position, a wheel support member surrounding the support sleeve, means for detachably connecting the pivot head to the wheel support member, and means for biasing the pedestal from the raised to the lowered position responsive to removal of a wheel from the wheel support member when the pedestal is in the raised position.

2. In a wheel balancer, an upwardly extending substantially vertical support sleeve immovably fixed to a supporting base, an elongated pedestal movably carried within the support sleeve, said pedestal being comprised of a tappet portion and a separate substantially coaxial elongated follower portion, said tappet portion being of substantially less length than said follower portion, pedestal engaging means for moving the pedestal vertically between a raised and a lowered position, a pivot head substantially aligned with the pedestal which pivotally engages the tappet portion when the pedestal is in the raised position and which is pivotally disengaged from the tappet portion when the pedestal is in the lowered position, a wheel support member surrounding the support sleeve in spaced relation therefrom, means for detachably connecting the pivot head to the wheel support member, resilient means connected to the pedestal engaging means for biasing the pedestal engaging means from its pedestal-raised condition to its pedestal-lowered condition responsive to removal of a wheel from the wheel support member, a lip on the pivot head adjacent to and spaced from the tappet portion, a flange on the tappet portion overlying the lip on the pivot head intermediate the pivot head and the lip on the pivot head and vertically spaced therefrom when the pedestal is in the raised position and engaged with the lip when the pedestal is in the lowered position, the tappet portion being disengaged from the pedestal when the pedestal is in the lowered position.

3. In a wheel balancer, an upwardly extending substantially vertical support sleeve immovably fixed to a supporting base, an elongated pedestal slidably carried within the support sleeve, said pedestal being comprised of a tappet portion and a separate substantially coaxial elongated follower portion, said tappet portion being of substantially less length than the follower portion relative to the length of the follower portion, a cam in engagement with the end of the follower portion remote from the tappet portion, said cam having a portion which moves the pedestal vertically to a raised position and a portion which moves the pedestal vertically to a lowered position, means for movably mounting the cam, a pivot head substantially aligned with the pedestal, a pivot sphere partially disposed in the pivot head, a face on the end of the tappet portion remote from the follower portion which engages the pivot sphere when the pedestal is in the raised position and is spaced from the pivot sphere when the pedestal is in the lowered position, a wheel support member surrounding the support sleeve in spaced relation therefrom, means for detachably connecting the pivot head to the wheel support member, means for biasing the cam to place the pedestal in the lowered position when the wheel support member does not carry a wheel but insufficiently to do so when the wheel support member carries a wheel and the pedestal is in a raised position, a face carried by the pivot head, a face carried by the support sleeve juxtaposed to the face carried by the pivot head and spaced vertically therefrom an amount less than the vertical displacement of the pedestal in moving from raised to lowered position, an inwardly extending annular lip removably mounted on the pivot head surrounding the tappet portion in radially spaced relation therefrom, an outwardly extending annular flange on the tappet portion overlying the lip on the pivot head intermediate the pivot sphere and the lip on the pivot head and spaced vertically from the lip on the pivot head when the pedestal is in the raised position, and a circular spirit level carried by the pivot head concentrically with the pivot sphere.

4. A pivot mounting for a wheel balancer having a wheel support member pivotally mounted on a pedestal, comprising a pedestal engaging member, a substantially cylindrical pivot head defining a first central recess in one end and a second substantially cylindrical recess within the first recess, a pivot sphere partially disposed in the second recess and extending into the first recess, one end of the pedestal engaging member partially disposed within the first recess, the remainder of the pedestal engaging member extending away from the pivot head for engagement with the pedestal, a planar face on said one end of the pedestal engaging member engageable with the pivot sphere, an inwardly extending ring surrounding the pedestal engaging member in radially spaced relation therefrom and removably disposed in the wall of the first recess, an outwardly extending annular flange on the pedestal engaging member overlying the ring intermediate the ring and said planar face, a circular spirit level carried on the pivot head concentrically with the pivot sphere, and external circumferential threads on the pivot head for detachably connecting the pivot head to an internally threaded portion of the wheel support member, whereby the pivot head and the pedestal engaging member defining all the pivot surfaces are detachable as a unit from the wheel support member and from a base mounting the wheel support member through the means of the external circumferential threads.

5. In a wheel balancer having a wheel support member pivotally mounted on a pedestal, apparatus comprising a movable pedestal, a wheel support member, means movably supporting the pedestal, means acting on the pedestal to move the pedestal relative to said supporting means to engage the wheel support member, means acting on the pedestal to move the pedestal to disengage the wheel support member, and means operable when a wheel is not carried on the wheel support member for biasing the pedestal to a position in which the pedestal is disengaged from the wheel support member as the normal position of the pedestal.

6. In a wheel balancer, a wheel support member pivotally mounted on a movable pedestal, a cam which bears on the pedestal, the cam being adapted to move the pedestal between a first position in which the pedestal is disengaged from the wheel support member and a second position in which the pedestal pivotally engages the wheel support member, and means biasing the cam sufficiently to actuate the cam to move the pedestal from the second position to the first position when the wheel support member does not carry an external load but biasing the cam insufficiently to actuate the cam to move the pedestal from the second position to the first position when the wheel support member carries an external load.

7. In a wheel balancer, a wheel support member pivotally engaging a movable pedestal, a cam in engagement with the pedestal, said cam having a first portion which places the pedestal in a position of pivotal engagement with the wheel support member and a second portion which permits the pedestal to move relative to fixed surrounding structure to disengagement from the wheel support member, means for movably mounting the cam, and means for biasing the cam between engagement with the pedestal and the cam first portion to engagement of the pedestal and the cam second portion when the wheel support member does not carry a wheel, the cam biasing means being ineffective to move the cam from engagement of its first portion with the pedestal to engagement of its second portion with the pedestal when the wheel support member carries a wheel.

8. In a wheel balancer, a wheel support member pivotally engageable with a vertical pedestal, means for providing relative vertical movement between the wheel support member and the pedestal to engage the wheel support member and the pedestal, and means for biasing the means for providing relative vertical movement, the means for biasing being sufficient to disengage the wheel support member from the pedestal when the wheel support member does not carry a wheel but being insufficient to vary the vertical movement means from a pedestal-engaged to a pedestal-disengaged condition when the wheel support member does carry a wheel.

9. In a wheel balancer, an upwardly extending substantially vertical support sleeve immovably fixed to a supporting base, a pedestal reciprocably carried within the support sleeve, a cam in engagement with the pedestal, said cam having a portion which positions the pedestal in a raised position and a portion which positions the pedestal in a lowered position, means for movably mounting the cam, a pivot head disposed at the upper end of the support sleeve substantially aligned with the pedestal, the pivot head pivotally engaging the pedestal in raised position and being disengaged from the pedestal in lowered position for engagement with the support sleeve, a wheel support member surrounding the support sleeve in spaced relation therefrom, means for detachably connecting the pivot head to the wheel support member and resilient means for biasing the cam to change the pedestal position from the raised to the lowered position when the wheel support member does not carry a wheel, the resiliency of the biasing means being insufficient to effect such change in pedestal position when the wheel support member carries a wheel.

10. In a wheel balancer, a vertical support means divided into upper and lower portions, a wheel support member, a pivot head detachably connected to the wheel support member and providing a pivot connection between the wheel support member and the vertical support means, and means interconnecting the pivot head and the upper portion of the vertical support means when the pivot head is detached from the wheel support member to permit removal and replacement of the pivot head and the portion of the vertical support means upon which it rides as a unit without affecting the remainder of the balancer.

11. In a wheel balancer, a vertical support means divided into upper and lower portions, a wheel support member having an annular flange and a tapered wheel centering member disposed concentrically with the annular flange and with the vertical support means, a pivot head detachably connected to the wheel support member at a location above the tapered centering member and providing a pivot connection between the wheel support member and the upper portion of the vertical support means, the pivot head and the upper portion of the vertical support means being detachable from the remainder of the balancer as a unit to permit replacement of the pivot head and the portion of the vertical support means upon which it rides without affecting the wheel support member or the remainder of the balancer.

12. In a wheel balancer, a vertical pedestal divided into upper and lower portions, a wheel support member, a pivot head detachably connected to the wheel support member and providing a pivot connection between the wheel support member and the vertical pedestal, means for providing relative vertical movement between the pivot head and the pedestal, means for biasing the means for providing relative vertical movement to disengage the pivot head from the pedestal when the wheel support member does not carry a wheel and being insufficient to change the pivot head from a pedestal-engaged to a pedestal-disengaged condition when the wheel support member carries a wheel, and means interconnecting the pivot head and the upper portion of the vertical pedestal when the pivot head is detached from the wheel support member to permit removal and replacement of the pivot connection provided by the pivot head and the vertical pedestal as a unit.

References Cited in the file of this patent

UNITED STATES PATENTS

| | | |
|---|---|---|
| 1,524,041 | Leighton | Jan. 27, 1925 |
| 1,729,947 | Lannen | Oct. 1, 1929 |
| 2,306,528 | Davis et al. | Dec. 29, 1942 |
| 2,308,950 | Hulsander | Jan. 19, 1943 |
| 2,592,804 | Holl | Apr. 15, 1952 |
| 2,679,751 | Pfeiffer | June 1, 1954 |
| 2,909,063 | Bageman | Oct. 20, 1959 |